May 28, 1929.  McCONNELL SHANK  1,714,733
HOLLOW FLOAT
Filed Feb. 14, 1927
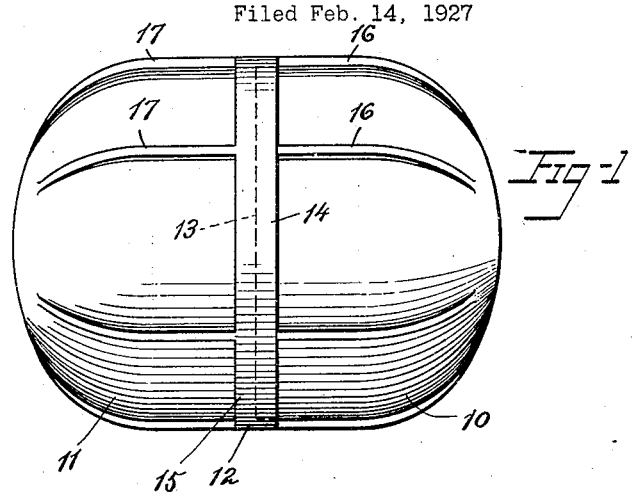
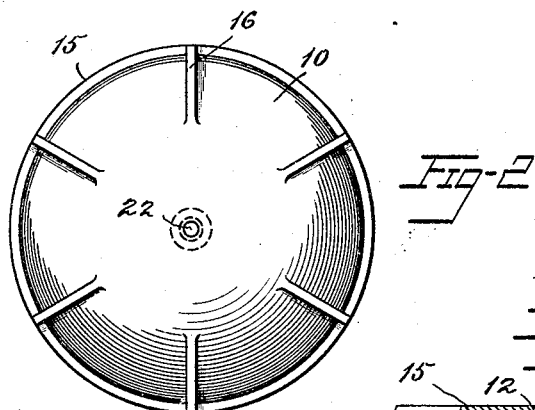
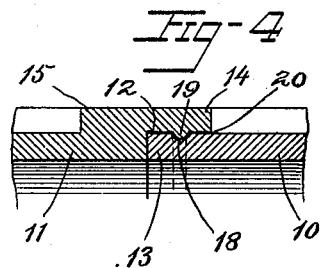
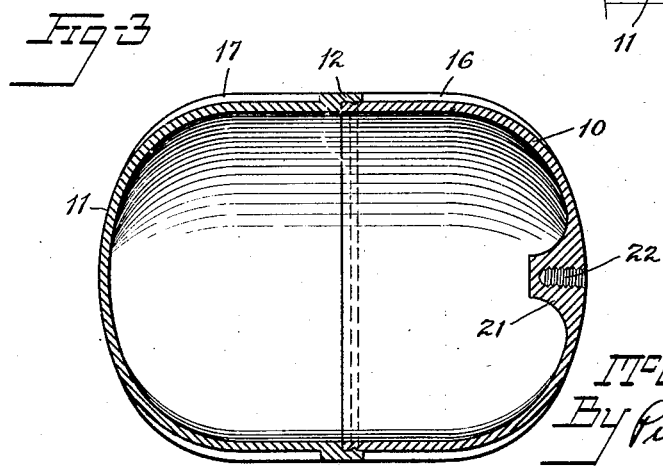
Inventor
McConnell Shank
By Pierson, Eakin & Avery
Attys.

Patented May 28, 1929.

1,714,733

UNITED STATES PATENT OFFICE.

McCONNELL SHANK, OF AKRON, OHIO, ASSIGNOR TO THE B. F. GOODRICH COMPANY, OF NEW YORK, N. Y., A CORPORATION OF NEW YORK.

HOLLOW FLOAT.

Application filed February 14, 1927. Serial No. 167,943.

This invention relates to hollow floats such, for example, as those used to control the water supply valve in a flush-tank, although the principles of the invention also apply to other types of floats and hollow articles.

My principal object is to provide an article of this class, adapted to be made of hard-rubber compound which shall be more durable under the conditions of service than a metal float and which may be made at a reasonable expense and with considerable saving as compared with prior hard-rubber floats.

An objection to the use of metal floats is that they are sometimes attacked by impurities found in the water in certain localities, this being true of copper floats, for example, and if made of sheet iron or steel it is difficult to avoid rusting without prohibitive expense.

Floats made of sponge hard rubber are relatively expensive and their manufacture is attended with many difficulties, while hollow, blown, hard-rubber floats are also difficult and expensive to manufacture and they have to be made of a relatively high grade of rubber in order to secure an effective sealing of the seams during vulcanization.

By employing a hard rubber molding process in the present invention, making the article in two halves or sections and interfitting the parts in a novel manner, I am enabled to use comparatively cheap hard-rubber compounds and connect the parts by a durable seam, thus obtaining the desired results at a relatively low cost.

Of the accompanying drawings, Fig. 1 is a side elevation of a hard-rubber float embodying and made in accordance with my invention.

Fig. 2 is an end view of the same.

Fig. 3 is a longitudinal section.

Fig. 4 is a partial longitudinal section on an enlarged scale, showing a preferred construction of the seam or joint.

The float is preferably of oblong shape, as shown, and consists of two cup-shaped parts or sections 10, 11 joined in the middle by a circumferential seam 12. Said seam includes two telescopically interfitted members 13, 14, the member 13 being formed by the marginal or edge portion of the float section 10 and the member 14 being an off- set axial flange forming part of a broad raised rib 15 on the float section 11. Shallow, longitudinal, reinforcing ribs 16, 17 are run from the edges of the circumferential rib 15 along the outer surface of the float at intervals around its circumference, in order to give the necessary strength to the float with the minimum amount of material.

I may provide the joint or seam with an interlocking feature consisting of a shallow, circumferential groove 18 in one of the telescopic members, in this case the member 13, and a mating circumferential rib 19 on the other member such as 14. In the joint between the two members is located a thin layer 20 of cement adapted to form an air and water tight seal. While this cement may be of any suitable character capable of adhering properly to hard rubber, I prefer to employ a benzol solution of a tough, balata-like thermoplastic isomer of rubber, such as described in the Fisher Patent No. 1,605,180 of November 2, 1926.

21 is an integral boss projecting axially inward from the end wall of the float section 10 and 22 is a screw-threaded socket in said hole, which may be formed directly in the hard rubber, for receiving the end of a valve-actuating rod.

The two float sections 10, 11 are molded and vulcanized under high compacting pressure between inner and outer metal mold members of simple form, and a dense and impervious structure is thus obtainable with a comparatively cheap hard-rubber mixture or compound, the rubber ingredient being permissibly mixed with suitable filling or extending materials. It is preferred to cool the rubber sections at least partially while still in their molds to avoid blowing and minimize shrinkage stresses. The final cooling of each section may be done outside of the outer mold on a suitable internal form or mandrel to avoid substantial distortion from a true circular shape, in order that the mating ends of the two sections may easily be interfitted.

The end of the float section 10 is then dipped in or painted with cement and the cement allowed to dry to a tacky condition and the interior seam-forming surface of the section 11 within the flange 14 is painted with the same cement. Section 11 is then placed in an inverted position or edge down on a hot plate in order to expand its edge portion, a moderate degree of heat being sufficient on account of the high coefficient of expansion of hard rubber. While it is still warm, the ends of the two sections are telescopically interfitted and the member 14 is shrunk upon the member 13 by cooling, thus forming with the aid of the sealing layer 20 of cement a strong and impervious joint.

It is contemplated that the foregoing steps and features may be more or less varied without departing from the scope of my invention. The invention applies to hard rubber floats or analogous articles generally, whether or not of fluid-tight construction.

I claim:

A hollow article of hardened, molded, plastic composition comprising two sections fitted together in a telescopic seam and externally reinforced with integral, longitudinal ribs which in the section bearing the outer seam member are joined to a circumferential rib which includes said outer seam member.

In witness whereof I have hereunto set my hand this 15th day of January, 1927.

McCONNELL SHANK.